(12) United States Patent
Rainville et al.

(10) Patent No.: US 7,104,743 B2
(45) Date of Patent: Sep. 12, 2006

(54) VACUUM RECEIVER WITH POSITIVE DUMP VALVE CONTROL

(75) Inventors: Donald D. Rainville, Woodbridge, VA (US); Robert R. Crawford, Woodbridge, VA (US); Leonard Paquette, Woodbridge, VA (US); William Goldfarb, Manassas, VA (US)

(73) Assignee: Universal Dynamics, Inc., Woodbridge, VA (US)

( * ) Notice: Subject to any disclaimer, the term of this patent is extended or adjusted under 35 U.S.C. 154(b) by 0 days.

(21) Appl. No.: 10/872,788

(22) Filed: Jun. 22, 2004

(65) Prior Publication Data

US 2005/0019108 A1 Jan. 27, 2005

(51) Int. Cl.
*B65G 65/00* (2006.01)

(52) U.S. Cl. ............... 414/288; 406/171; 222/504; 141/302

(58) Field of Classification Search ......... 406/169, 406/171, 173; 414/291, 288; 141/65, 301, 141/302; 222/509, 152
See application file for complete search history.

(56) References Cited

U.S. PATENT DOCUMENTS

| | | | | |
|---|---|---|---|---|
| 2,992,858 A | * | 7/1961 | Pendleton | 406/168 |
| 4,492,294 A | * | 1/1985 | Ball | 193/25 C |
| 4,756,348 A | * | 7/1988 | Moller | 141/83 |
| 5,019,250 A | * | 5/1991 | Lorenzen | 210/85 |
| 6,231,273 B1 | * | 5/2001 | Amieux | 406/173 |
| 6,394,708 B1 | | 5/2002 | Braden | |
| 6,802,685 B1 | * | 10/2004 | Federhen | 414/292 |

FOREIGN PATENT DOCUMENTS

| | | |
|---|---|---|
| CH | 688753 | 2/1998 |
| DE | 10024428 | 11/2001 |

* cited by examiner

*Primary Examiner*—Joe Dillon, Jr.
(74) *Attorney, Agent, or Firm*—Crowell & Moring LLP

(57) ABSTRACT

A vacuum receiver for a pneumatic conveyor for conveying, e.g., plastic pellets, having a receiving vessel with a material inlet, a material outlet and a conveying gas outlet. A first valve member is provided for opening and closing the conveying gas outlet, and a second valve member is provided for opening and closing the material outlet. Both valve members are connected to a common valve shaft and actuated by a single actuator mounted on a vessel lid. The vacuum receiver of the invention has the advantage of affording positive control and sealing of the material discharge valve while at the same time being economical to manufacture and easily cleaned.

11 Claims, 3 Drawing Sheets

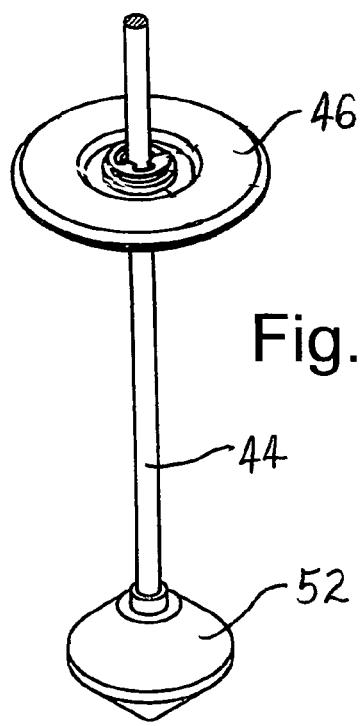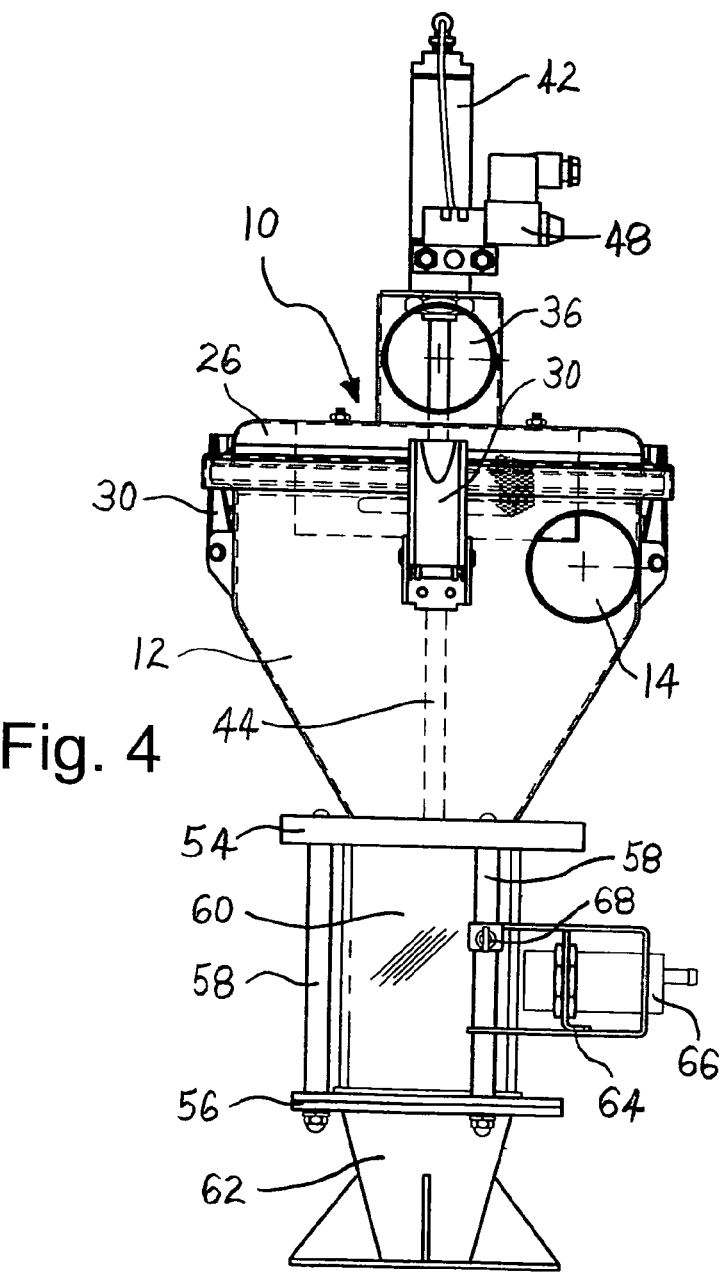

VACUUM RECEIVER WITH POSITIVE DUMP VALVE CONTROL

BACKGROUND OF THE INVENTION

The present invention relates to a new pneumatic conveying receiver with positive dump valve control, particularly for used as a vacuum receiver for a pneumatic conveying systems for conveying a particulate material, such as plastic pellets.

For many uses of bulk granular materials in the manufacturing environment a pneumatic transport system is the preferred method of bulk material handling. It allows the movement of a wide variety of materials through a simple tubular piping system. The low cost, easy installation, and when using vacuum as a motive power, minimal housekeeping since dust leaks are unlikely, make it a preferred selection. These systems will incorporate a power source such as a fan or blower, a source of material, a termination receiver, the connecting tube from the source to the receiver, and then on to the vacuum power unit, and a control device. In normal operation a simple system will load the individual receiver by engaging the air mover and allowing the source material to feed into the pickup end of the pipe, and separate at the receiver. This is done as a batch process to minimize costs associated with the valving of the material removal at the discharge of the receiver.

A typical construction of these units has an actuator, either air or electric to connect the receiver to the pneumatic power source, and a power operated discharge valve with a second actuator to discharge the conveyed product from the vessel. It is known to use air cylinders to provide power for operation of these valves, but when there are two separate functions, there are always two separate power units to maneuver the valves. The market for these devices is very cost sensitive, however, and if two air operators are used, the expense of the second actuator represents a significant cost disadvantage. In the exceptionally price competitive market of basic pneumatic conveying systems, the additional cost of an actuated discharge valve at each termination point can become prohibitive.

In a less costly arrangement, the expense of the second actuator may be avoided by using an un-powered, gravity-operated dump valve. A gravity operated discharge valve will allow the conveyed material to drop from the receiver after the vacuum dissipates when each batch has been completed. However, the lack of a positive actuation of the common gravity operated material dump valve mechanisms also leads to problems. In some cases this gravity operated valve will be blocked by stray granules of the material being handled, and consequently not transport a batch during the load cycle. Not infrequently such valves fail to properly seal due to the lack of a positive closing force. This failure to seal can prevent build-up of the necessary vacuum to draw further material from the pellet source to the vacuum receiver.

Thus, the usual construction of vacuum receivers uses either a gravity dump valve for the simple device, or an actuated material dump valve for the more positive seal. But when a gravity operated dump valve is used, there will be the opportunity to have a missed load cycle if the valve is partially open due to trapped granules at the sealing surfaces. And although use of a power actuated valve will overcome the usual trapped material at the seal, the cost of a second actuator device may render the apparatus prohibitively expensive.

The normal requirement for access to the internal vacuum receiver surfaces for cleaning and maintenance do not allow a convention linkage between the two valve devices to be used on a typical vacuum receiver. These units typically incorporate a funnel bottom, cylindrical vessel with the material dump valve at the lower end of the funnel. The upper end of the cylinder will be open, and a separate lid will cover the opening, and will usually hold or contain the air/material separator media, and the air outlet. Since the selection valve is associated with the lid and air outlet, a removable lid makes it unfeasible to link a dump valve device to the vacuum sequence selection valve on the air outlet.

SUMMARY OF THE INVENTION

Accordingly, it is the object of the invention to provide an improved vacuum receiver with a positive dump valve control.

It is also an object of the invention to provide a reliably operating vacuum receiver which can be constructed at moderate cost by eliminating the need for a second actuator to control the dump valve.

Yet another object of the invention is to provide a vacuum receiver with a positive dump valve control, which is inexpensive to produce and yet allows the vessel lid to be readily removed to facilitate cleaning of the receiving vessel.

These and other objects are achieved in accordance with the present invention by providing a vacuum receiver for a pneumatic conveying system comprising a receiving vessel having a material inlet, a material outlet and a conveying gas outlet; a conveying gas valve for selectively opening and closing said conveying gas outlet; a discharge valve for selectively opening and closing said material outlet; and a single actuator for actuating said convey gas valve and said discharge valve.

Further preferred aspects of the invention are described in the dependent claims.

In accordance with the present invention, a single air operator is arranged in a unique way to actuate both the a valve connecting the vacuum receiver to a pneumatic power (vacuum) source and to actuate a positively operated dump valve for emptying the receiver into a hopper. In this way, it is possible to avoid the disadvantages of a non-positively acting, gravity-operated discharge valve for the dumping of the vessel and provide a positively controlled dump valve while eliminating the need for a second operator.

In construction of these chambers, the need for an automatically compensating seal force is provided by an air cylinder. The use of a "Short Stroke" in both directions to alternately seal the air manifold (i.e., the connection to the conveying power source), and the material conveying vessel dump valve compensates for any minor differences in manufacturing tolerances or wear over time.

The design of the terminal end of a pneumatic conveyor for granular bulk solids comprises a vessel with a material inlet, an air/material separator, an air outlet and a material outlet. In the present invention, the material outlet on the receiver is not a gravity operated dumping valve. Instead, a power actuated valve is employed as a more positive device.

In many convey systems there are more than one vacuum receiver on a single air power (vacuum) source. In this configuration, a valve is required to access each individual vacuum receiver since only one convey receiver can be operating on line at a time. The construction of the vacuum receivers for these systems employs an actuator of the vacuum line access of the individual receiver.

The vacuum receiver according to the invention uses a single operator with two attachment positions for both a vacuum sequence valve and an internal positive acting material dump valve. The method to accomplish this relies on the use of an air operated actuator for movement of both sealing devices. Positioning each of the seals in such a manner that the air cylinder will seat and seal its respective opening before reaching the end of the cylinder stroke affords a positive seal while still accommodating any small dimensional changes in the assembly or misalignment of components.

By use of the lower conical portion of the vacuum receiver as the dump valve seat, it will automatically guide the seal to full contact with the cone. The upper air sequence valve seal is provided with a soft contact attachment so any minimal angular misalignment will be overcome.

Another important feature of the new device is that the whole mechanism is mounted on the lid of the receiver so it removes with the lid allowing complete access to the internal surfaces of the chamber for cleaning.

An additional benefit of a single actuator is that it avoids the use of two devices, and the attendant opportunity for breakage or other malfunction.

BRIEF DESCRIPTION OF THE DRAWINGS

The invention will be described in further detail hereinafter with reference to illustrative preferred embodiments shown in the accompanying drawings, in which:

FIG. 3 is a perspective view of the dual valve arrangement of the invention.

FIG. 4 is a side elevational view of an alternative embodiment of the invention provided with a glass tube chamber for monitoring the inventory of particulate material in the vacuum receiver.

DETAILED DESCRIPTION OF PREFERRED EMBODIMENTS

Figure 1:
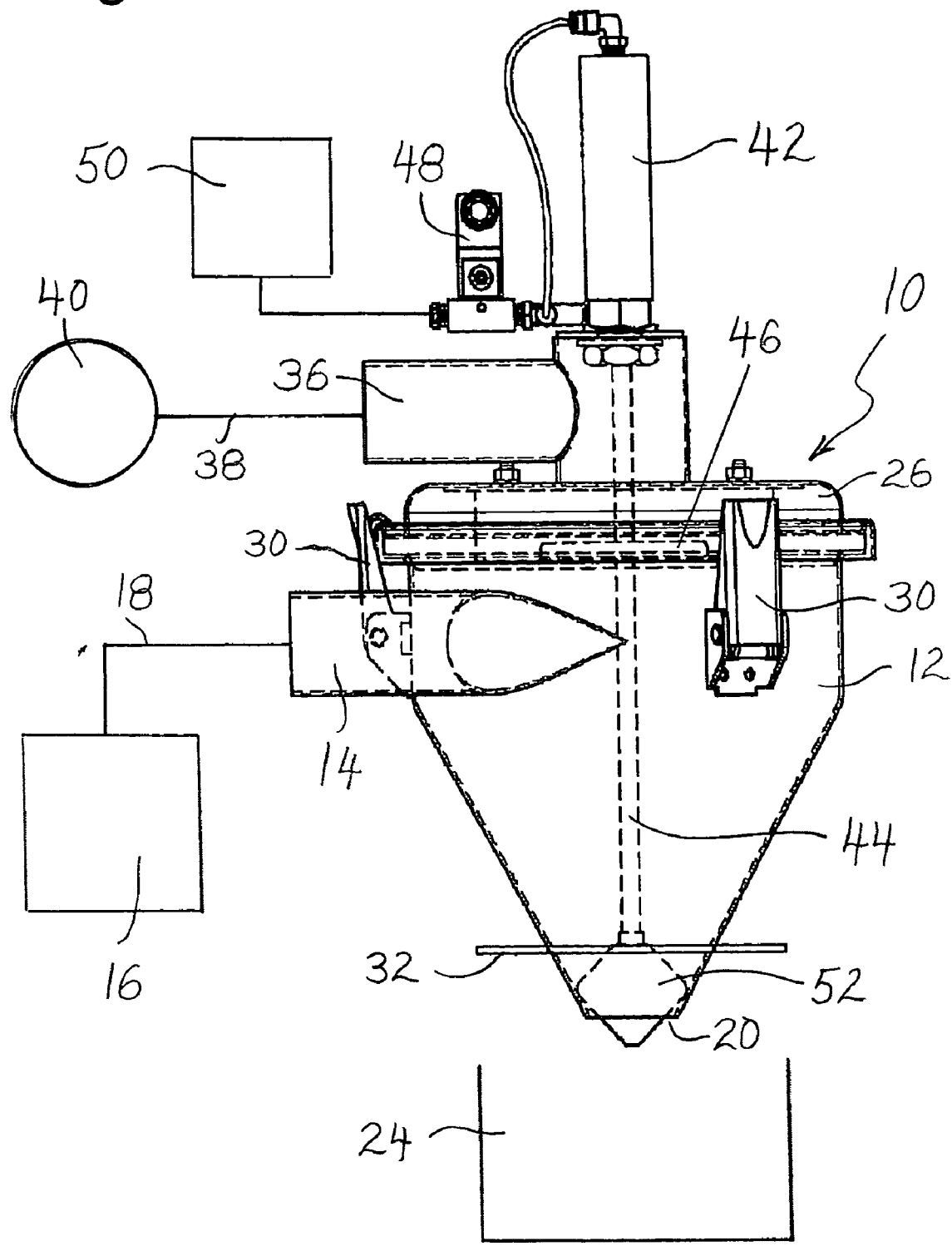
FIG. 1 is a side elevational view of an embodiment of a vacuum receiver according to the invention.

FIG. 1 is a side elevation view of an embodiment of a vacuum receiver according to the invention. The vacuum receiver 10 comprises a receiving vessel 12 having a material inlet 14, a material outlet 20 and a conveying gas outlet 36. Receiving vessel 12 is preferably a funnel bottom vessel, with the material outlet 20 disposed at the bottom of the funnel portion of the vessel. A lid 26 is provided for the top of the vessel. In the illustrated embodiment, lid 26 is held in place by a plurality of clamps 30, although it will be recognized that any suitable fastening mechanism could be used to affix the lid to the receiving vessel.

A conveying gas source 40, such as a vacuum pump, is connected via a connecting tube 38 to the conveying gas outlet 36. Material inlet 14 is connected to a granular material source 16 via a connecting tube 18. A mounting flange 32 is secured to receiving vessel 12 to facilitate mounting the receiving vessel in a desired position above a receiving hopper 24, which may, for example, be a supply hopper for a plastic molding machine.

Figure 2:
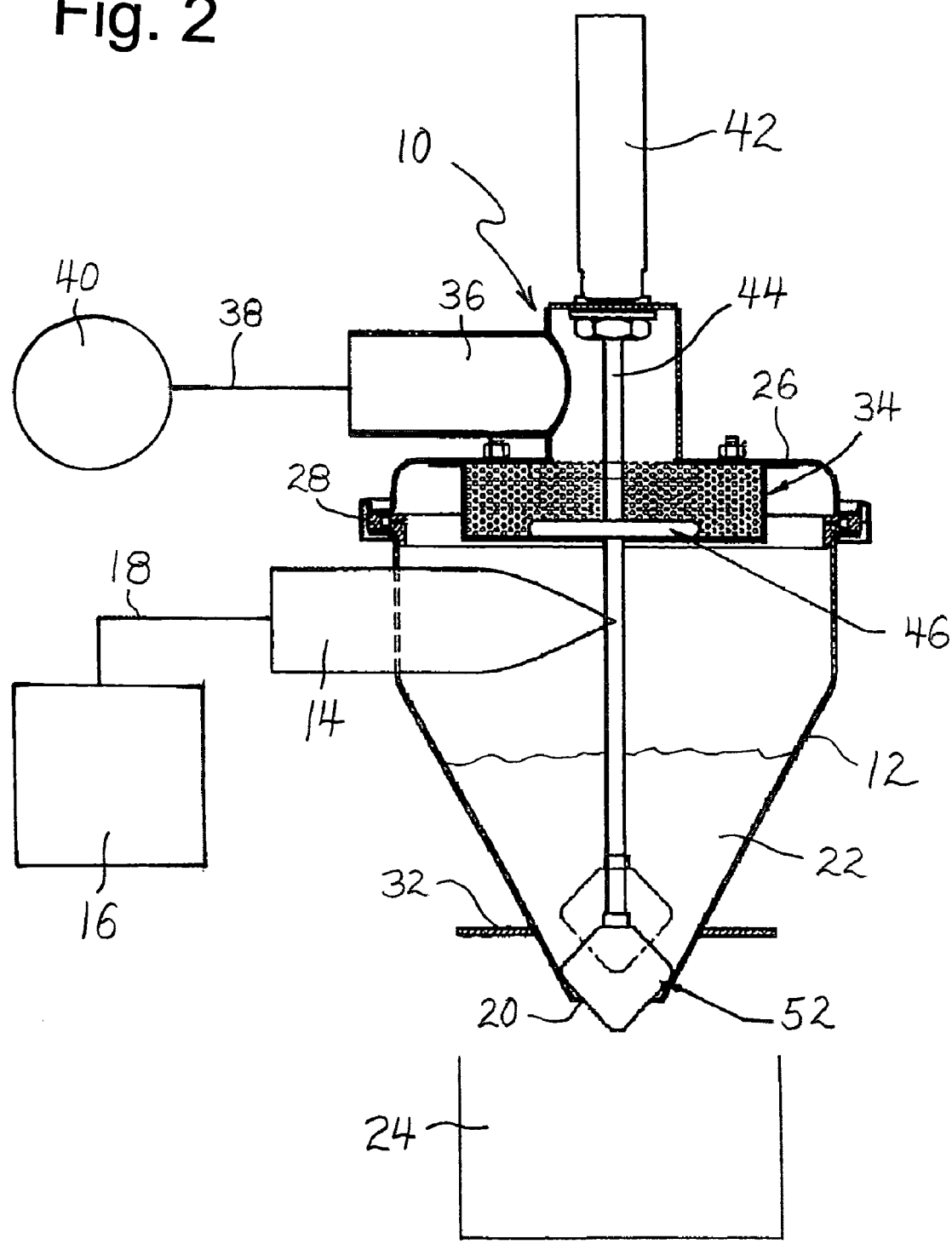
FIG. 2 is a sectional view of the vacuum receiver embodiment of FIG. 1.

As seen more clearly in FIG. 2, which is a sectional view of the vacuum receiver 10, a screen 34 is provided in front of the conveying gas outlet 36. Screen 34 serves to separate conveyed particles, e.g. plastic pellets, from a stream of conveying gas, e.g. air, inside the vacuum receiver. Also visible in FIG. 2 is a lid seal 28, which is disposed between the receiving vessel 12 and the receiver lid 26 in order to provide a gas-tight closure.

A conveying gas valve member 46 is provided in order to open and close the conveying gas outlet 36. Likewise, a material discharge valve member 52 is provided to open and close the material outlet 20 at the bottom of the receiving vessel 12. Conveying gas valve member 46 and material discharge valve member 52 are both connected to a common valve rod 44. The valve rod, in turn, is connected to an actuator 42, such as a compressed air cylinder, by which valve rod 44 can be extended or retracted. In the illustrated embodiment, extension of valve rod 44 moves conveying gas valve member 46 downwardly in order to unblock the conveying gas outlet 36. Extension of valve rod 44 also moves material discharge valve member 52 downwardly to a position in which is seats firmly against the lower walls of the funnel portion of the receiving vessel 12, thereby closing material outlet 20.

In operation, the vacuum pump which serves as conveying gas source 40 is switched on to draw a stream of air out of the vacuum receiver 10, so that a reduced pressure is created therein. The reduced pressure in vacuum receiver 10, in turn, draws granular material entrained in a stream of conveying gas from granular material source 16 through connecting tube 18 and material inlet 14 into the vacuum receiver 10. An accumulation of granular material 22 is shown in the bottom of receiving vessel 12. Screen 34 prevents any of the granular material 22 from passing with the conveying gas through conveying gas outlet 36.

When the granular material 22 in receiving vessel 12 reaches a desired level, a controller 48 is actuated to admit compressed air from a compressed air source 50 to the bottom of air cylinder 42 so that valve rod 44 is retracted, or in other words raised. This moves conveying gas valve member 46 upwardly over the mouth of the conveying gas outlet 36, thereby blocking the flow of conveying gas and terminating the pneumatic transfer of granular material from granular material source 16 into the vacuum receiver 10.

At the same time, the retraction of valve rod 44, also moves material discharge valve member 52 to a raised position, so that material discharge 20 is opened, and the granular material 22 can flow out of the receiving vessel 12, thereby delivering a desired batch of the granular material 22 into receiving hopper 24.

After the vacuum receiver 10 is emptied, controller 48 is again actuated, this time to deliver compressed air from compressed air source 50 to the top of air cylinder 42, thereby driving valve rod 44 downwardly to its extended position. This urges the material discharge valve member 52 with a positive force against the mouth of the funnel bottom of receiving vessel 12, thereby tightly closing the material outlet 20. At the same time, conveying gas outlet valve member 46 is moved downwardly away from the entrance to conveying gas outlet 36, thereby enabling the vacuum pump 40 to draw a new stream of conveying gas with entrained granular material 22 from granular material source 16 into the vacuum receiver 10.

If it is necessary to clean the vacuum receiver, for example if the vacuum receiver is to be switched to a different source of plastic pellets, this may be easily accomplished by removing lid 26. Since the actuator 42, valve rod 44, conveying gas valve member 46 and material discharge valve member 52 are all connected to lid 26, they will all be moved out of the way when the lid 26 is removed, thereby providing unhindered access to the receiving vessel 12 for cleaning.

FIG. 3 is a perspective view of the valve assembly of the invention showing how the conveyance air valve member 46 and the dump valve member 52 are both mounted on a common valve rod 44. Dump valve member 52 has a conical configuration to achieve a positive conic seal with the funnel bottom of receiver vessel 12 when valve rod 44 is urged downwardly by actuator 42.

FIG. 4 is a side elevational view of an alternative embodiment of the vacuum receiver of the invention in which like parts are identified by the same reference numerals as in the first embodiment illustrated in FIGS. 1 through 3. The operation of this embodiment is essentially the same as the embodiment of FIGS. 1 through 3. However, the funnel bottom of receiving vessel 12 is provided with a glass tube chamber to enable monitoring of the particulate material in the apparatus. In this embodiment, the funnel bottom of the receiving vessel is provided with an upper clamping flange 54, which in turn, is connected to a lower clamping flange 56 by a plurality of rods 58. The bottom clamping flange 56 is connected to a support base or mounting base 62. A transparent glass tube 60 is clamped between the upper and lower clamping flanges 54 and 56. If desired, resilient seal members (not shown) may be arranged between the clamping flanges and the glass tube to assure that the system remains vacuum tight. Transparent glass tube 60 allows visual observation of the supply of particulate material in the vacuum receiver. The glass tube chamber is typically sized to maintain five shots or five minutes of material at the feed throat of the apparatus. Easy access to the glass tube chamber for cleaning or other purposes may be obtained by simply unscrewing the rods 58.

To facilitate automatic control of the level of particulate material in the system, the glass tube chamber 60 optionally may be provided with a level sensor 66 mounted in a sensor support bracket 64. Sensor 66 can provide a control signal to operate the vacuum valve to fill and empty the receiving vessel 12. Sensor support bracket 64 is movably mounted on one or more of the support rods 58 so that it can be raised or lowered as needed to adjust the position of the level detector and the amount of particulate material maintained in the glass tube chamber 60. In the illustrated embodiment, a thumb screw 68 is provided to hold the bracket 64 and sensor 66 at the desired level, but any other suitable clamping arrangement could be used instead.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

LIST OF REFERENCE NUMERALS

10 Vacuum receiver
12 Receiving vessel with funnel bottom
14 Material inlet
16 Granular material source
18 Connecting tube
20 Discharge outlet
22 Granular Material
24 Receiving hopper
26 Receiver lid
28 Lid seal
30 Lid clamps
32 Mounting flange
34 Separator screen
36 Air outlet
38 Air connecting tube
40 Convey air (vacuum) source
42 Actuator (compessed air cylinder)
44 Valve rod
46 Convey air valve
48 Controller
50 Compressed air source
52 Discharge valve
54 Upper clamping flange
56 Lower clamping flange
58 Rods
60 Glass tube chamber
62 Base
64 Sensor support bracket
66 Material level sensor
68 Thumbscrew

What is claimed is:

1. A vacuum receiver for a pneumatic conveying system for conveying material comprising:
   a receiving vessel having a material inlet for receiving material under vacuum, a material outlet and a conveying gas outlet;
   a conveying gas valve for selectively opening and closing said conveying gas outlet;
   a discharge valve for selectively opening and closing said material outlet; and
   a single actuator that concurrently actuates said convey gas valve and said discharge valve, wherein the actuator positively actuates each valve from the valve's opening to the valve's closing and from the valve's closing to the valve's opening.

2. A vacuum receiver according to claim 1, wherein said receiving vessel has an open top, further comprising a lid for closing the top of said receiving vessel.

3. A vacuum receiver according to claim 2, wherein said actuator, said convey gas valve and said discharge valve are all mounted on said lid.

4. A vacuum receiver according to claim 1, wherein said vessel has a funnel bottom, and said material outlet is arranged at the bottom of said funnel bottom.

5. A vacuum receiver according to claim 1, wherein said actuator comprises an air cylinder connected to a source of compressed air.

6. A vacuum receiver according to claim 1, further comprising a material separator in said vessel for separating a conveyed material from the conveying gas.

7. A vacuum receiver according to claim 6, wherein said material separator comprises a screen.

8. A vacuum receiver according to claim 1, wherein said conveying gas valve comprises a first movable valve member arranged on an extensible and retractable valve shaft, and said discharge valve comprises a second movable valve member arranged on said extensible and retractable valve shaft.

9. A vacuum receiver according to claim 1, wherein said material outlet opens into a transparent glass tube chamber for monitoring the supply of a particulate material conveyed by the vacuum receiver.

10. A vacuum receiver according to claim 9, wherein said transparent glass tube chamber is provided with a material level sensor.

11. A vacuum receiver according to claim 10, wherein the position of said material level sensor is adjustable up and down.

* * * * *